United States Patent [19]

Clegg et al.

[11] 4,245,013

[45] Jan. 13, 1981

[54] BATTERY SEPARATORS

[75] Inventors: Gordon A. Clegg, Rossendale; Ernest J. Pearson, Swinton, both of England

[73] Assignee: Chloride Group Limited, London, England

[21] Appl. No.: 37,165

[22] Filed: May 8, 1979

[30] Foreign Application Priority Data

May 11, 1978 [GB] United Kingdom ............... 18987/78

[51] Int. Cl.³ ............................................. H01M 2/14
[52] U.S. Cl. .................................... 429/144; 429/147; 429/248; 429/252; 429/255
[58] Field of Search .................. 429/141–144, 429/249–252, 255, 248, 146, 147

[56] References Cited

U.S. PATENT DOCUMENTS

| Re. 23,644 | 4/1953 | Grant | 429/144 |
|---|---|---|---|
| 2,511,887 | 6/1950 | Vinal | 429/144 |
| 2,653,985 | 9/1953 | Philipps | 429/251 X |
| 2,673,887 | 3/1954 | Booth | 429/250 X |
| 2,930,829 | 3/1960 | Jacquier | 429/144 |
| 2,994,728 | 8/1961 | Herold | 429/144 |
| 3,997,366 | 12/1976 | Davis, Jr. | 429/144 |

*Primary Examiner*—Anthony Skapars
*Attorney, Agent, or Firm*—Oblon, Fisher, Spivak, McClelland & Maier

[57] ABSTRACT

A synthetic pulp separator for a lead acid battery, the separator having two or more plies and a ribbed profile the surface adapted to face the positive having a higher content of synthetic pulp than the other surface.

13 Claims, 4 Drawing Figures

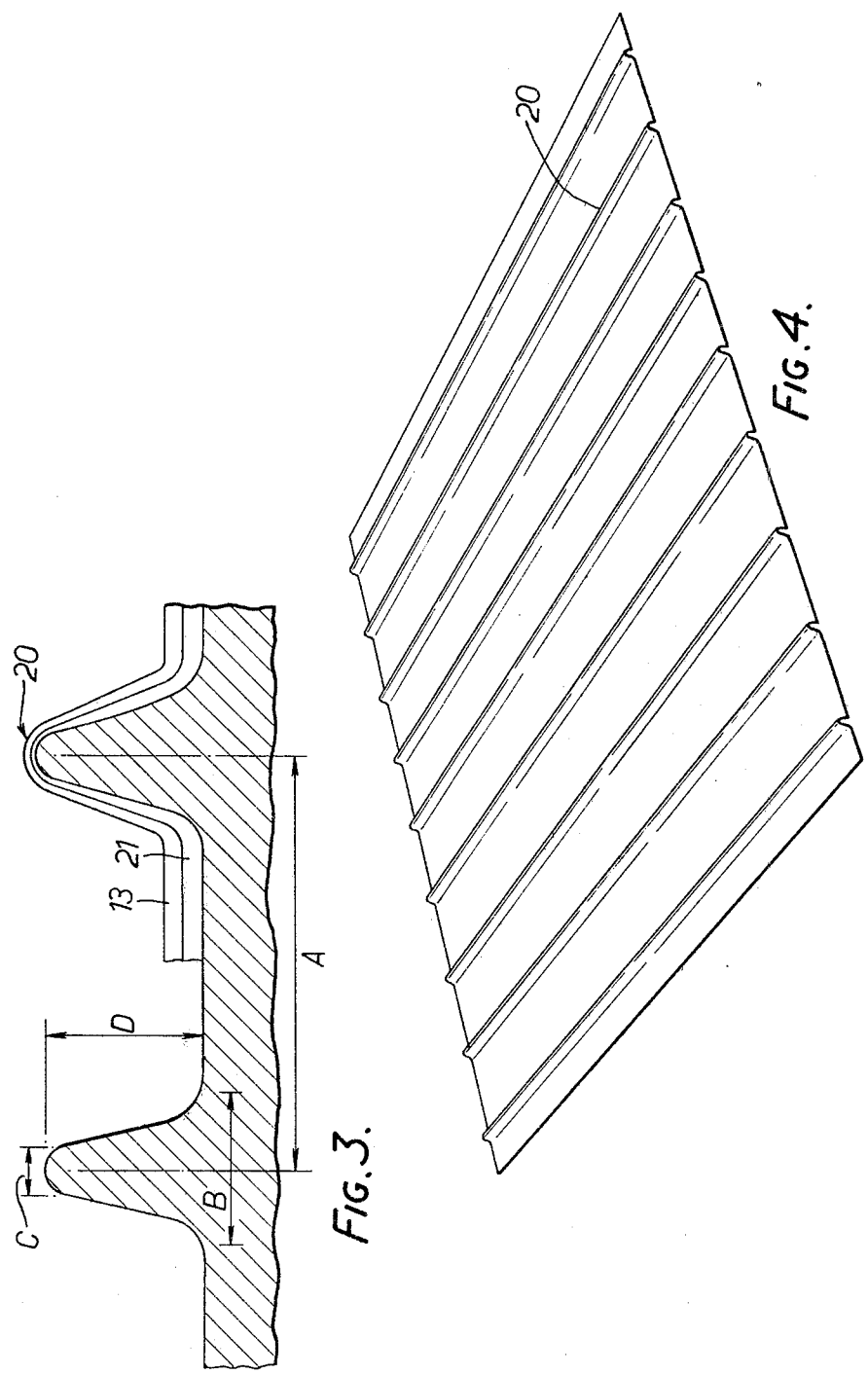

BATTERY SEPARATORS

BACKGROUND OF THE INVENTION

Field of the Invention

The present invention relates to battery separators made from or including synthetic pulp.

Many types of synthetic pulp are known. However for economical production of battery separators we prefer synthetic pulps made from polyolefins for example polypropylene and ethylene propylene copolymers and in particular polyethylene since it has the best combination of cheapness and properties appropriate to long life in a battery environment, especially a lead acid battery.

SUMMARY OF THE INVENTION

According to one aspect of the present invention a battery separator comprises a laminate of at least one first layer affording a profiled exterior appropriate for juxtaposition to the positive plate of a lead acid battery and having a high content of synthetic pulp and at least one other layer adherent to the first layer, this second layer having a lower content of synthetic pulp than the said first layer.

The term "synthetic pulp" has its generally accepted meaning of a pulp made up of fibrils of a polyolefin. The individual fibrils may be present in various sizes and various specific surfaces, the shape and size distribution being not unlike that of refined wood pulp. Each fibril usually has a central backbone with a number of laterally projecting branch tendrils.

DESCRIPTION OF THE PREFERRED EMBODIMENTS

The first, or positive, layer preferably contains at least 75% e.g. 80% to 100% by weight of synthetic pulp based on total dry solids.

The first layer may also contain a minor proportion e.g. up to 25% e.g. 10 to 20% by weight of fibres having a higher stiffness than the synthetic pulp fibres or fibres effective to impart increased stiffness to the separator. These fibres may be glass polyester or polycarbonate fibres. The first layer may also contain a minor proportion e.g. up to 25% of cellulose fibres e.g. wood pulp fibres.

The second layer may contain 30 to 60% of cellulose fibres, and synthetic pulp. It may also contain a minor proportion e.g. up to 25% e.g. 10 to 20% of fibres having a higher stiffness than the synthetic pulp fibres or fibres effective to impart increased stiffness to the separator.

The two layers are preferably adhered during the paper making technique by forming the two layers as two separate water leaves and then juxtaposing the two wet layers and then passing the double ply material over the hot cans of the paper making machine or otherwise drying them under conditions such as to ensure that they adhere to each other.

The synthetic pulp is preferably a polyolefin fibre material which has been made by a flash spinning process. Examples of such techniques are given in British Pat. Nos. 1,287,917 and 1,350,487. These techniques produce fibres with very large surface areas e.g. about 1 $m^2$/gram and the fibres are staple fibres 0.2 to 3 mms in length. The polyolefins may have high molecular weight e.g. in the range 40,000 to 20,000,000 especially 500,000 and above.

Such pulps can form adherent waterleaves without the need for additional resin binders being incorporated in the furnish though the presence of such binders is not excluded.

The synthetic pulp fibres are preferably subjected to an oxidative treatment prior to being formed into the furnish used to form the waterleaf.

This oxidative process is designed to increase the wettability of the fibres. This can assist in the paper making process and also improve the properties, of the battery separator itself, reducing the need for post treatment with a wetting agent or incorporation of wetting agents in the furnish which may interfere with the paper making process.

The oxidative process can consist of or include treatment of the fibres, e.g. of polyolefin, with chromic acid, nitric acid, nitric acid-hydrochloric acid blends such as aqua regia, hypochlorite, permanganate, chlorosulphonic acid, or hydrogen peroxide, ozone or ultra-violet radiation and this latter agent can be used in conjunction with the other agents.

Gas phase chemical treatments e.g. by corona discharge or with ozone or ultra-violet light can also be used to increase the wettability of the fibres.

Other chemical treatments effective to increase the wettability of the polyolefin fibres can also be used for example gas phase exposure to halogens and sulphur dioxide, carbon monoxide or carbon dioxide in sunlight or ultra-violet light or other ionizing radiation to achieve halosulphonation or halocarboxylation of the fibres. The fibres must then be subjected to hydrolysis and substantially complete elimination of ions liable to interfere with the electrochemical process in the battery for example halogen ions and heavy metal ions such as chromium; this can be achieved by washing and by the substantial washing effect of the large volumes of water used in the furnish which are removed during the paper making technique. It is preferred however to use oxidative techniques which do not introduce interfering ions. Whilst the preferred oxidative technique reduces the need for wetting agents it may be desirable to incorporate certain selected wetting agents to reduce the internal resistance of the separator.

We prefer to use sulphonates such as alkyl aryl sulphonates, for example sodium dodecyl benzene sulphonate, or succinates such as sulphosuccinates, for example sodium dioctyl sulphosuccinates, or quaternary ammonium wetting agents such as alkyl aryl alkyl quaternary ammonium chlorides which by reason of their charge structure are believed to adhere very strongly to the synthetic pulp fibres. This is a substantial advantage for separators for use in so-called drain dry batteries which may be stored with the plates and separators damp for long periods before initial use, and for prevention of de-wetting of the separators in service.

These wetting agents can be incorporated in the furnish for the first layer or for both layers or can be incorporated in the waterleaves e.g. by spraying thereon or in the laminated material after it has been dried e.g. by spraying thereon.

The laminated material may have the profiled exterior imparted to the first layer by a hot calendering process. This can be carried out before the plied waterleaf is fully dry or after it has been dried. The material may be consolidated over its whole area and may have ribs imparted into it by a crimping process. The profile is preferably a series of parallel spaced folds resulting in a series of grooves with corresponding ribs on the reverse side.

Alternative profiles are spaced apart protuberances. However, the profile should be such as to ensure that gas trapping does not occur at the positive plate in use. Clearly the dimensions of the profile to achieve the necessary spacing will thus have to vary to suit the individual type of battery.

It is desirable to incorporate some synthetic pulp in the second layer to allow hot calendering to increase the adhesion between the first and second layers. Thus if the calendering is carried out in spaced apart areas e.g. parallel lines which may be parallel to the edges of the separator or inclined thereto or spaced apart dots or areas, heavy consolidation can be carried out to fuse contacting fibres of the synthetic pulp to each other in the first layer and in the second layer and also across the boundary region where the two layers meet. Overall calendering could, if desired, be carried out with a profiled roller which would impart ribs or channels to the material at the same time, a rib on one surface corresponding to a channel on the others. This not only increases the lamination strength but also increases the strength of the individual layers. Since the heavy consolidation is limited to only part of the surface area of the separator the required porosity values can still be achieved.

The surface pore size of the separator can also be controlled, and thereby the resistance of the separator to "treeing through", by applying a light higher temperature overall consolidation to the surface of the first layer, preferably before the profiled calendering, to achieve fusion of the synthetic pulp fibres to each other immediately adjacent to the surface without significant consolidation in the body of the separator. Clearly this surface fusion must not be such as to destroy the porosity of the surface, merely it must reduce the pore size of the surface.

The calendering at the surface of the first layer reduces the porosity of the separator in the surface in proximity to the positive plate and thus reduces the tendency for "treeing through" to occur. Preferably the surfaces of the ribs on the first layer are subjected to the most conslidation.

According to a preferred embodiment of the invention a battery separator comprises a laminate of a first layer affording a profiled exterior appropriate for juxtaposition to the positive plate of a lead acid battery and containing at least 75% by weight of polyethylene synthetic pulp fibres, preferably having a surface area in excess of 1 m²/gram, 0 to 25% by weight of cellulose pulp fibres and 0 to 25% by weight of synthetic fibres having a stiffness greater than the polyethylene fibres, and a second layer adherent to the first layer and containing 30 to 60% by weight of cellulose pulp fibres, 40 to 70% by weight of polyethylene synthetic pulp fibres and 0 to 25% by weight of synthetic fibres having a stiffness greater than the polyethylene fibres, the separator having parallel spaced lines of ribs or folds, preferably disposed parallel to an opposed pair of edges of the separator, the consolidation being such that polyethylene fibres are fused to each other in each area of consolidation through the first layer and into the second layer whereby the adherence of the layers is increased.

The lines of consolidation are preferably 0.5 to 2 mm wide and are spaced by 1 to 4 mms, the spacing between lines preferably being greater than the width of the lines e.g. 2, 3 or 4 times greater. The overall reduction in thickness of the separator is such that the thickness is at least 40% e.g. 70 to 90% or 99% of the original thickness of the unconsolidated material, which may have been 0.2 to 1 mm.

The profiling is preferably carried out by calendering the sheet using a heated ribbed metal roller applied to the first surface using a cold resilient, e.g. a rubber, backing roll to which the second surface is applied. The material is thereby crimped or corrugated and reduced in width but increased in thickness e.g. to 0.5 to 2.0 mm.

According to another preferred embodiment of the invention a method of making a battery separator in accordance with the invention comprises providing polyolefin synthetic pulp fibres, subjecting them to an oxidative process to increase the wettability of the fibres, preferably a process which does not introduce any electrochemically interfering ions for the battery environment in which the separator is to be used, washing out any such interfering ions to an acceptably low level, forming a first furnish containing as solids at least 75% by weight of the oxidized polyolefin synthetic pulp, 0 to 25% by weight of cellulose wood pulp fibres and 0 to 25% by weight of synthetic fibres having a stiffness greater than the polyolefin fibres, forming the first furnish into a first waterleaf, forming a second furnish containing as solids 30 to 60% by weight of cellulose wood pulp fibres, 40 to 70% by weight of the oxidized polyolefin synthetic pulp, and 0 to 25% by weight of synthetic fibres having a stiffness greater than the polyolefin fibres, forming the second furnish into a second waterleaf, plying the two waterleaves to each other, drying the plied waterleaves and consolidating the laminate by applying heat and pressure along spaced parallel lines, preferably parallel to the edges of the laminate from the free side of the first waterleaf, whereby a profile appropriate for juxtaposition to the positive plate of a lead acid battery is formed.

BRIEF DESCRIPTION OF THE DRAWINGS

This invention may be put into practice in various ways and two specific embodiments will be described to illustrate the invention with reference to the accompanying examples in which all parts are by weight unless otherwise specified, and with reference to the accompanying drawings, in which:

FIG. 3 is a section of an embossing roller of the FIG. 2 unit showing diagrammatically the variation in consolidation between the ribs and the web; and FIG. 4 is a perspective view of a finished battery separator.

DETAILED DESCRIPTION OF THE INVENTION

EXAMPLE 1

This process produces a duplex paper web. A first ply was made as follows:

4.5% of Antaro CO430, a nonyl phenol ethoxylate surfactant from GAF (UK) Ltd., was added to an aqueous dispersion of Ferlosa $C_2KS$ synthetic pulp (the weight of Antarox being based on the dry weight of the Ferlosa) to produce pulp A;

Ferlosa C₂KS is supplied by Montedison and is a synthetic polyethylene pulp, the fibrils of which are filled with 42% by weight of china clay;

5% of BC788, a melamine formaldehyde wet strength aid from British Industrial Plastics Limited was added to an aqueous dispersion of bleached softwood pulp beaten to 45% SR (the weight of BC788 being based on the dry weight of the wood pulp) to produce pulp B;

Pulp A and pulp B were then blended with a 45% SR bleached hardwood sulphate pulp and 0.5% of aluminium sulphate based on total dry weight of fibres was added for improved retention of surfactant to produce a furnish containing synthetic pulp, softwood pulp and hardwood pulp in the weight ratio 70:15:15, and this was made into the first ply on a Foudrinier machine. The second ply was made from a furnish consisting of a blend of pulp A and pulp B in which the weight ratio of synthetic pulp to softwood pulp was 80:20.

Figure 1:
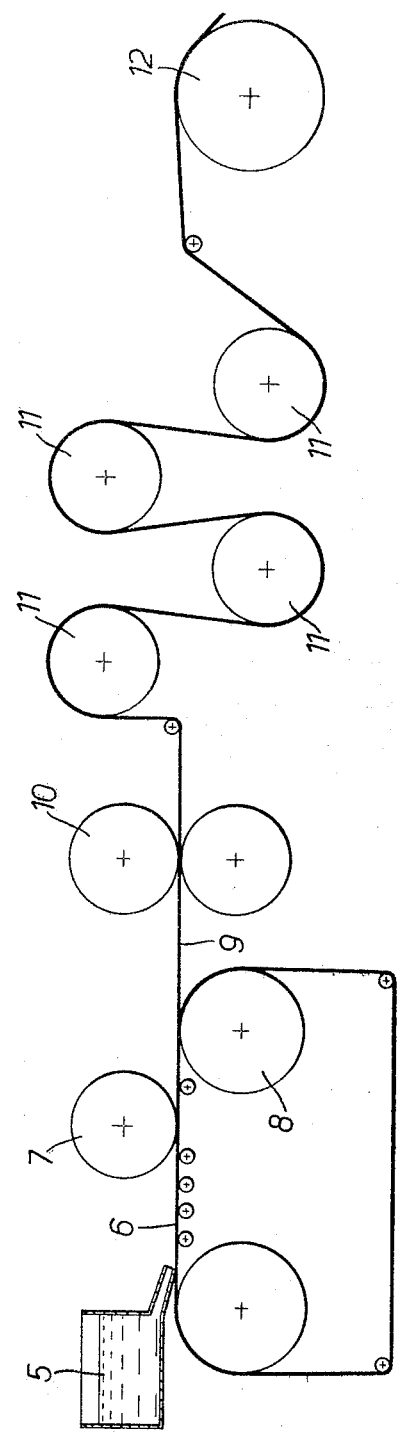
FIG. 1 is a diagram of a Foudrinier paper making machine.

Conversion of each furnish to a paper web was carried out by introducing the furnish into a flow box 5 of a Foudrinier paper machine (see FIG. 1), from which the furnish was laid on a moving wire 6 which passed under a dandy roll 7 and around a couch roll 8 through which suction was applied. The resulting wet paper web 9 was passed through a press section 10 around drying cylinders 11, and reeled onto a reel 12, by-passing the conventional machine calender rolls.

The machine parameters were adjusted so that the wet press roll pressure at the section 10 was adjusted to a minimum operating pressure; the temperature of the machine drying cylinders 11 was maintained below 120° C; and the production rate was adjusted to achieve a moisture content at reel up of between 2 and 3%. Immediately after paper manufacture the paper rolls were enclosed in a polythene wrapper.

Figure 2:
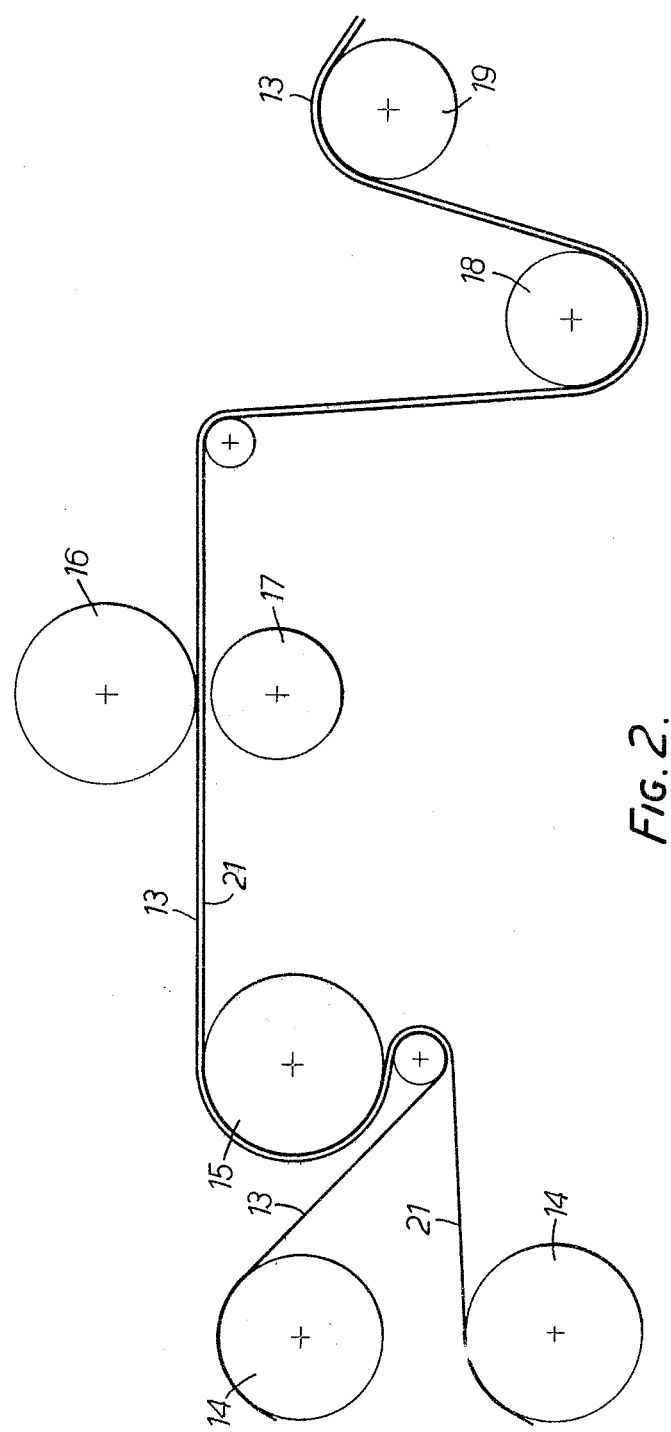
FIG. 2 is a diagram of an embossing unit.

The two reeled base plies were then superimposed and thermally consolidated and embossed by means of the unit shown in FIGS. 2 and 3. Thus each paper web 13 and 21 was unreeled from a reel 14, still with a moisture content of between 2 and 3%, and at a speed of between 5 and 15 meters per minute passed around a heated cylinder 15 which was at a temperature of between 170° and 200° C., through the nip between a pair of embossing rolls 16 and 17, around a chilled cooling cylinder 18, and reeled onto a reel 19. The rolls 16 and 17 are a male steel embossed roll 16 and a rubber roll 17 of controlled hardness. An acceptable profile for the roll 16 is shown in FIG. 3, in which the dimension A is 15.5 mm, B is 500 microns, C is between 100 and 200 microns, and D is 1200 microns.

It will be appreciated that the thermoplastic synthetic pulp component of the paper web 13 will be softened during passage around the cylinder 15, and the thermoplastic fibrils will be partially fused together during passage through the rolls 16 and 17. These rolls compress the paper web over its full area and simultaneously emboss the web with parallel ribs in the cross web direction at 15.5 mm centres. As the web is subsequently cooled, particularly after passage around the cylinder 18, the thermoplastic component sets in the new configuration.

The resulting embossed paper web, which has a weight of 160 g/m² is subsequently unreeled from the reel 19 and cut into individual square battery sections, of which one having ribs 20 and a square side of 15 cm is shown in FIG. 4. It will be appreciated that the ribs 20 will have substantially the same profile as the roll 16 as shown in FIG. 3.

The web 13 is the second ply having the higher synthetic pulp content and it thus is at the surface of the separator which will be juxtaposed to the positive plate in use i.e. it is the outer surface of the ribs 20.

EXAMPLE 2

Example 1 was repeated except that the first ply was made from a modified form of pulp A which instead of containing 15 parts of hardwood pulp and 15 parts of softwood pulp contained 30 parts of the softwood pulp but was otherwise identical to pulp A.

The duplex material had an electrical resistance before ageing of 150 m ohms cm² and after ageing of 225 m ohms cm².

These electrical resistance values were measured after immersion in battery sulphuric acid of 1.280 sg for 20 minutes.

The test after ageing refers to the electrical resistance measured after 12 cm × 10 cm sheets cut from the thermally consolidated paper web had been immersed in 1.280 sg sulphuric acid at 75° C. for one hour before washing in water for 1½ hours and drying at 90° C. for 30 to 40 minutes. During the washing the sheets were separated by 1 mm and contacted by distilled water moving at 5 l/min, at a contact rate of 40 ccs of water/cm² of sheet/min.

What is claimed is:

1. A battery separator comprising a laminate of at least one first layer affording a profiled exterior appropriate for juxtaposition to the positive plate of a lead acid battery and containing at least 75% by weight of synthetic pulp and at least one other layer adherent to the first layer, said second layer containing from 30 to 60% by weight of cellulose fibers and not more than 70% by weight synthetic pulp.

2. A separator as claimed in claim 1 in which the first layer also contains a minor portion of cellulose fibres.

3. A separator as claimed in claim 1 in which the first layer or the second layer or both also contain a minor portion by weight of fibres having a higher stiffness than the synthetic pulp fibres, or fibres effective to impart increased stiffness to the separator.

4. A separator as claimed in claim 3 in which the said fibres are selected from the group consisting of glass fibres, polyester fibres and polycarbonate fibres.

5. A separator as claimed in claim 1 in which the synthetic pulp fibres are subjected to chemical treatment prior to being formed into the furnish used to form the waterleaf, the chemical treatment being designed to increase the wettability of the fibres.

6. A separator as claimed in claim 5 in which the chemical treatment comprises an oxidative process consisting of or including treatment of the fibres with chromic acid, nitric acid, nitric acid-hydrochloric acid blends such as aqua regia, hypochlorite, permanganate, chlorosulphonic acid, hydrogen peroxide, corona discharge, ozone or ultra-violet radiation.

7. A separator as claimed in claim 1 incorporating as a wetting agent an effective amount of wetting agent selected from the group consisting of a quaternary ammonium wetting agent, a sulphonate wetting agent and a succinate wetting agent.

8. A separator as claimed in claim 1 in which the laminated material has the profiled exterior imparted to the first layer by a hot calendering process.

9. A separator as claimed in claim 8 in which the surface pore size of the separator is controlled by applying overall consolidation to the surface of the first layer to achieve fusion of the synthetic pulp fibres to each other immediately adjacent the surface without significant consolidation in the body of the separator.

10. A battery separator which comprises a laminate of a first layer affording a profiled exterior appropriate for juxtaposition to the positive plate of a lead acid battery and containing at least 75% by weight of polyethylene synthetic pulp fibres, 0 to 25% by weight of cellulose pulp fibre and 0 to 25% by weight of synthetic fibres having a stiffness greater than the polyethylene fibres, and a second layer adherent to the first layer and containing 30 to 60% by weight of cellulose pulp fibres, 40 to 70% by weight of polyethylene synthetic pulp fibres and 0 to 25% by weight of synthetic fibres having a stiffness greater than the polyethylene fibres, the separator having parallel spaced lines of consolidation, the consolidation being such that polyethylene fibres are fused to each other in each area of consolidation through the first layer and into the second layer whereby the adherence of the layers is increased.

11. A separator as claimed in claim 10 in which the lines of consolidation are 0.5 to 2 mm wide and are spaced by 1 to 4 mms, the spacing between lines being greater than the width of the lines.

12. A separator as claimed in claim 10 in which the thickness of the material of the separator is at least 40% of the thickness of the material before consolidation.

13. A battery separator comprising a laminate of at least one first layer affording a profiled exterior appropriate for juxtaposition to the positive plate of a lead acid battery and containing at least 75% by weight of a synthetic pulp, 0 to 25% by weight of cellulose fibres and 10 to 20% by weight of fibres having a higher stiffness than said synthetic pulp and at least one other layer adherent to the first layer, said second layer containing as solids 30 to 60% by weight cellulose pulp fiber and not more than 70% by weight synthetic pulp.

* * * * *